United States Patent [19]
Lam

[11] Patent Number: 5,867,818
[45] Date of Patent: Feb. 2, 1999

[54] PROGRAMMABLE SOUND SYNTHESIZER APPARATUS

[76] Inventor: Peter Ar-Fu Lam, 20104 Wayne Ave., Torrance, Calif. 90503

[21] Appl. No.: 538,426

[22] Filed: Oct. 2, 1995

[51] Int. Cl.[6] .................................................. G10L 9/00
[52] U.S. Cl. ................................. 704/270; 704/258
[58] Field of Search ................................. 395/2.84, 2.67, 395/2.79, 564, 739; 364/130, 238; 704/275, 258, 270, 500, 503

[56] References Cited

U.S. PATENT DOCUMENTS

| | | | |
|---|---|---|---|
| 3,810,118 | 5/1974 | Kiffmeyer | 340/172.5 |
| 4,180,862 | 12/1979 | Seipp | 364/900 |
| 4,200,916 | 4/1980 | Seipp | 364/900 |
| 4,500,993 | 2/1985 | Jacobson | 371/16 |

*Primary Examiner*—Richemond Dorvil

[57] ABSTRACT

Programmable control apparatus applicable for use with a sound synthesizer is disclosed having a programming method to be structured in a first table format (10) defining the configurations (13, 14, 15, 16) of input/output terminals (12) and second listing format (20) defining the events (21, 22, 23, 24) to be executed upon receiving of a qualified input signal. Hardware embodiments comprising of predefined I/O state memory to specify the various I/O configuration states (11) is also presented. Said hardware embodiments are structured closely correlated to the programming method to enable the fabrication of a low cost programmable control apparatus.

42 Claims, 15 Drawing Sheets

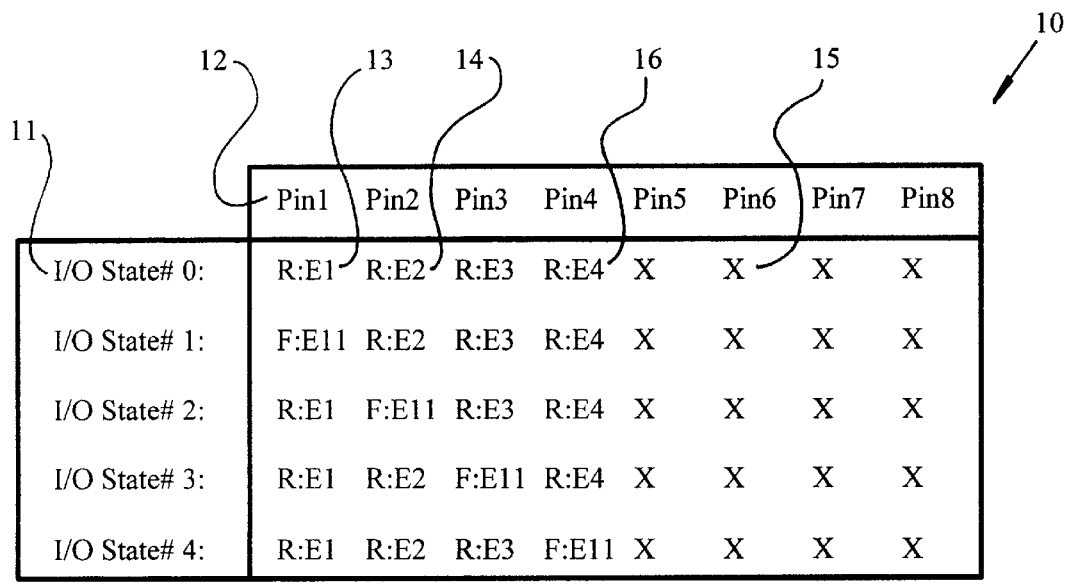
FIG. 1-a
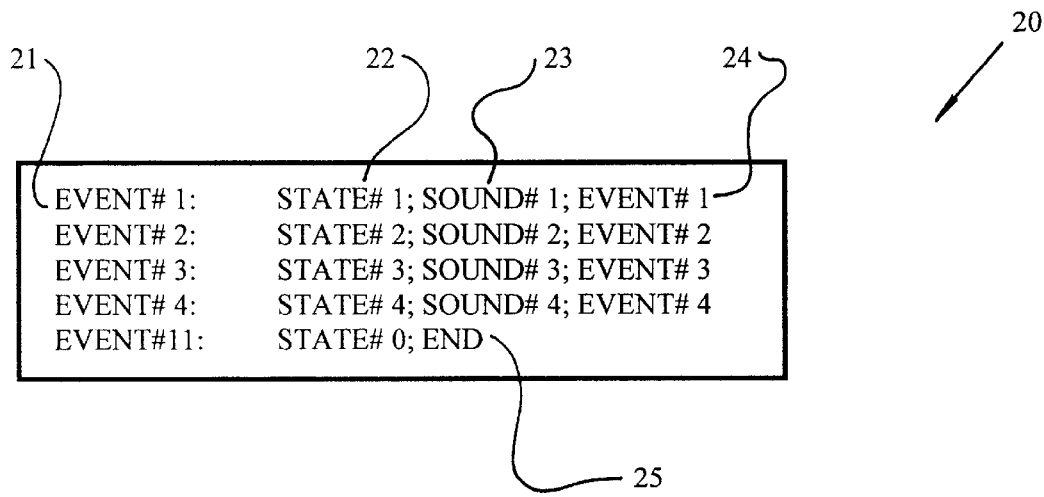
FIG. 1-b

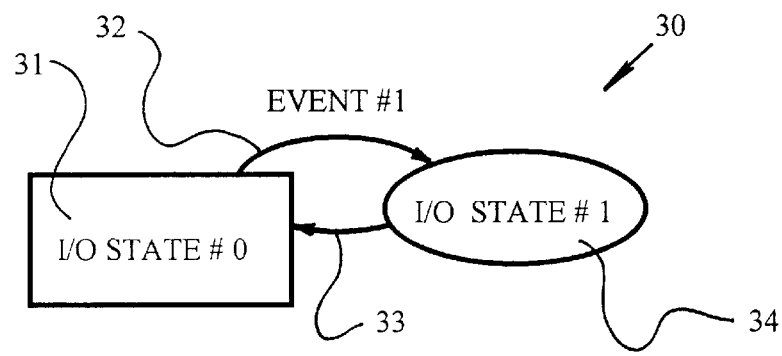
FIG.2A
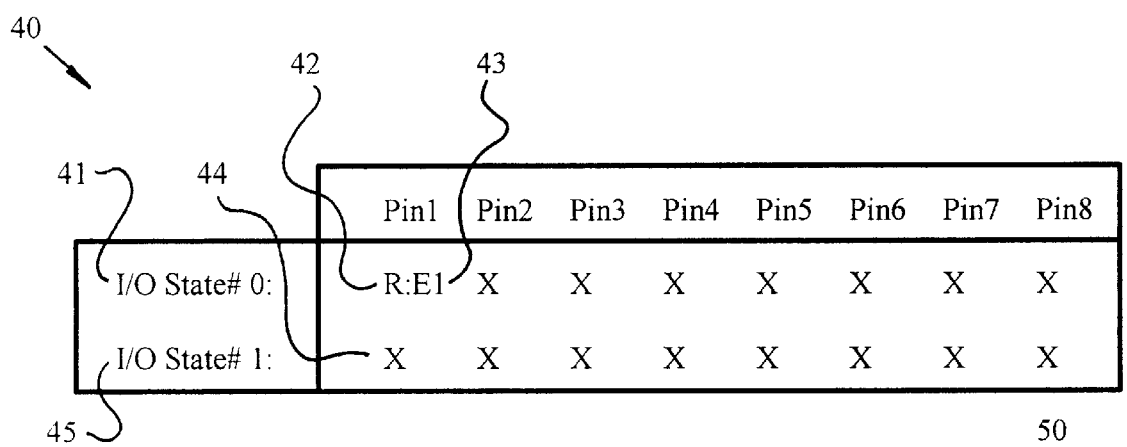
FIG. 2B-a
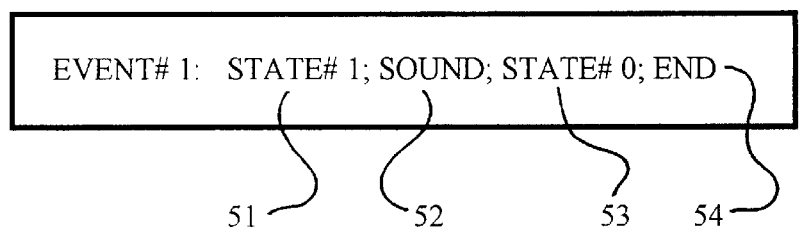
FIG. 2B-b

|  | Pin1 | Pin2 | Pin3 | Pin4 | Pin5 | Pin6 | Pin7 | Pin8 |
|---|---|---|---|---|---|---|---|---|
| I/O State# 0: | R:E1 | R:E2 | R:E3 | R:E4 | X | X | X | X |
| I/O State# 1: | X | R:E2 | R:E3 | R:E4 | X | X | X | X |
| I/O State# 2: | R:E1 | X | R:E3 | R:E4 | X | X | X | X |
| I/O State# 3: | R:E1 | R:E2 | X | R:E4 | X | X | X | X |
| I/O State# 4: | R:E1 | R:E2 | R:E3 | X | X | X | X | X |

FIG.3B-a

```
EVENT# 1:    STATE# 1; SOUND# 1; STATE# 0; END
EVENT# 2:    STATE# 2; SOUND# 2; STATE# 0; END
EVENT# 3:    STATE# 3; SOUND# 3; STATE# 0; END
EVENT# 4:    STATE# 4; SOUND# 4; STATE# 0; END
```

FIG.3B-b

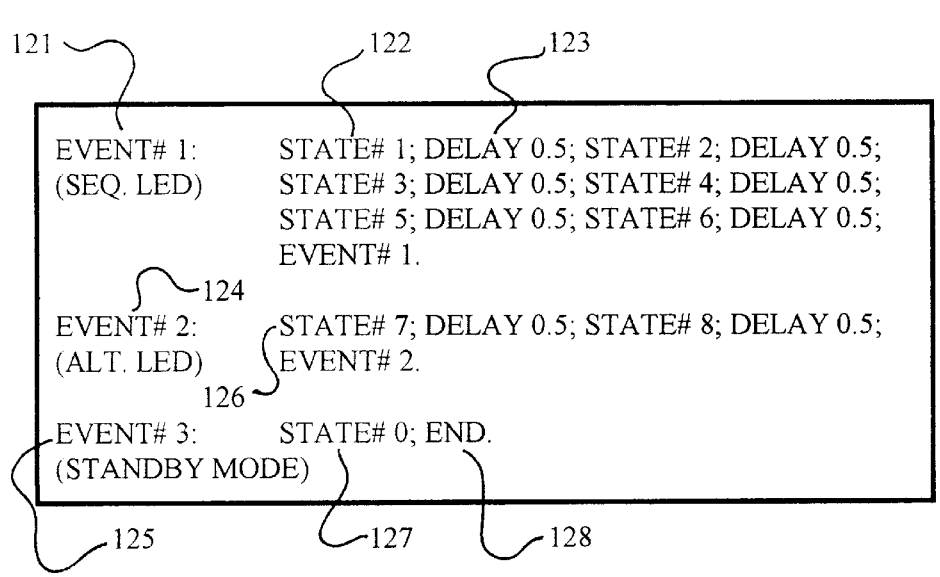
FIG. 4B-a
FIG. 4B-b

| | Pin1 TG | Pin2 | Pin3 | Pin4 | Pin5 | Pin6 | Pin7 | Pin8 |
|---|---|---|---|---|---|---|---|---|
| I/O State# 0: POWER UP STANDBY BY MODE | R:E1 | X | X | X | X | X | X | X |
| I/O State# 1: TG OFF | X | X | X | X | X | X | X | X |
FIG. 10A-a
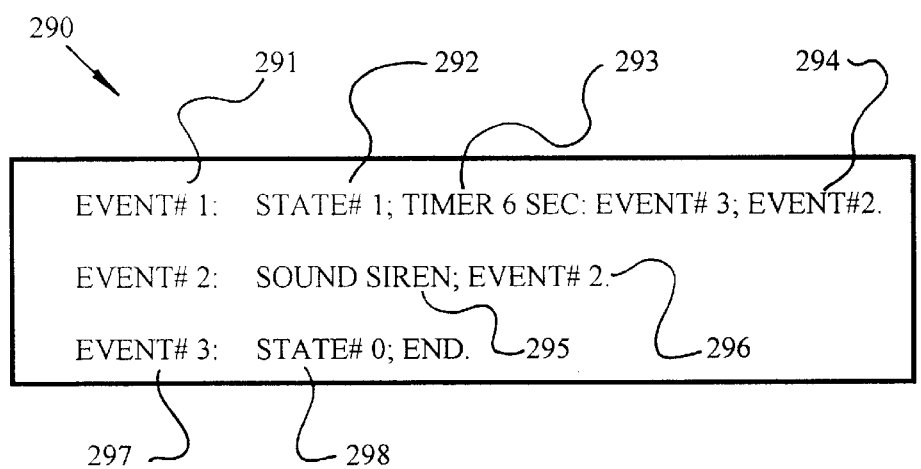
EVENT# 1: STATE# 1; TIMER 6 SEC: EVENT# 3; EVENT#2.
EVENT# 2: SOUND SIREN; EVENT# 2.
EVENT# 3: STATE# 0; END.
FIG. 10A-b

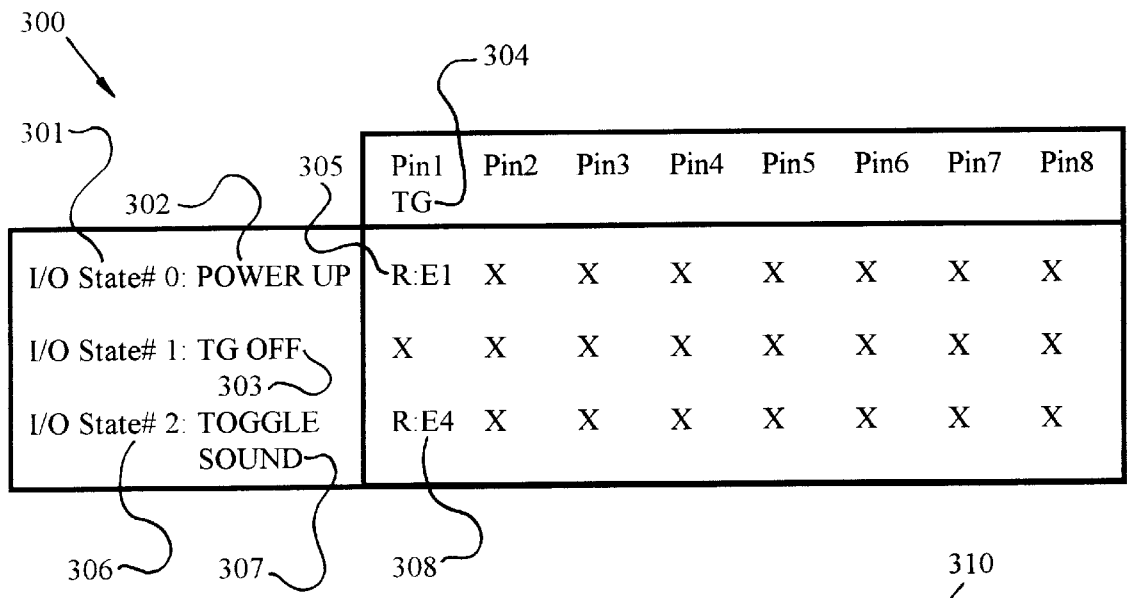
FIG. 10B-a
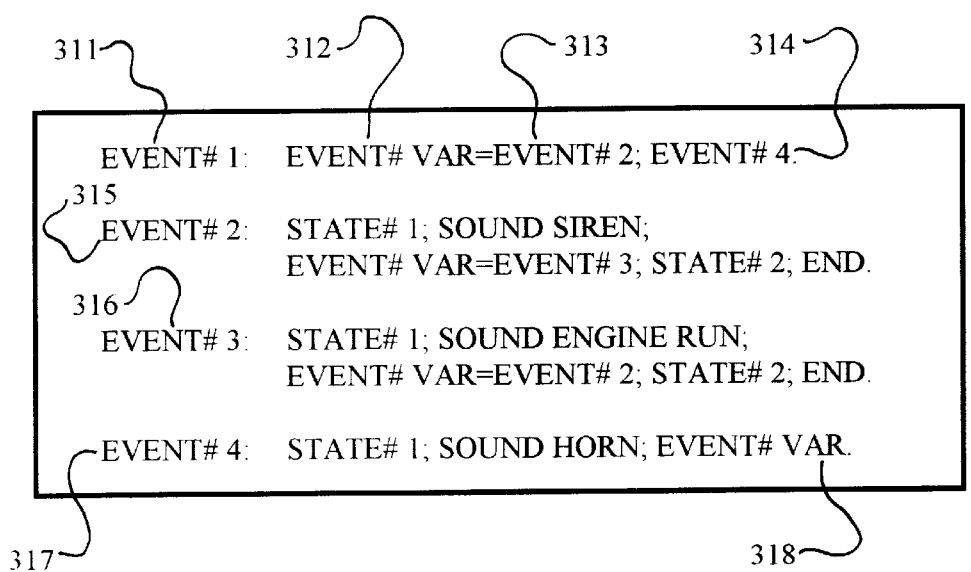
FIG. 10B-b

PROGRAMMABLE SOUND SYNTHESIZER APPARATUS

FIELD OF THE INVENTION

The present invention relates to a programmable control apparatus responsive to external electrical stimulation to interactively producing output signals comprising of simulated audio signal and digital driving signals.

BACKGROUND OF THE INVENTION

Traditional sound synthesizing apparatus samples an analog audio source signal; the sampled signal is encoded into digital data with different kinds of compression algorithm and stored in a memory. Upon playback, the digital data is decoded and converted into analog signal to drive an audio transducer. Later developed programmable sound synthesizer further integrated the design with a microprocessor which enables the synthesized sound to be generated interactively according to external electrical stimulation by a step by step assembly language programming process. The objective of the invention is to develop a low cost programmable sound synthesizing apparatus with simple structured programming method which does not contain any difficult to learn instruction set of an assembly language such that the programming process can be carried out by ordinary people without intensive training of the concept and skill of assembly language programming and understanding of the microprocessor architecture.

SUMMARY OF THE INVENTION

The present invention is directed to the inventive steps of studying the basic elements desirable by a programmable sound synthesizing apparatus; building up a graphical model to represent the operation of a control system simple enough to be applied by ordinary people without receiving any intensive professional training; develop a simple programming format to systematically document the programming function required and eventually, develop a coding system and a hardware circuit to work with the model and the simple programming format developed.

The simple programming method of the present invention comprises the steps of filling up two tables or two fields of data. The first field of data names different steady or transition configuration states of the input/output terminals, define the configuration of the input/output terminals, and specifying the event to be executed when an input terminal receives a qualified trigger signal. The second field of data defines the responses of an event when a qualified trigger signal is received.

The hardware embodiments of the invention are directed to the input/output (I/O) structure and data memory structure of a programmable apparatus to produce synthesized audio signal and/or digital output signals. Typical hardware embodiment comprises of a number of input/output terminals (I/O terminals), each I/O terminal is connected to a number of signal qualifying circuits, for the detection of predetermined qualified input signals; a number of output signal drivers, for the delivering of an output signal; an event data memory to store the event to be executed when a qualified signal is received; an I/O state configuration memory storing structured data to configure the input/output status of the I/O pins as well as to address the event data memory when a qualified trigger signal is received; an event execution circuit receiving data from the event data memory to generate different kinds of output signals; and the addressing circuits to address the event data memory and the I/O state configuration memory.

The debugging of the programming process is also taking advantage of the simple programming structure. In many cases, the program debugging process can be carried out by interactively addressing the triggering modes of a single page data table which is displayed on a monitor screen. The simple programming structure substantially cut down the development cost, the programming time and the debug time required to develop a product with interactive control features.

The major difference in the structure of the simplest and minimally structured embodiment of the invention, when compared with a microprocessor based control apparatus is that it does not contain any program counter, arithmetic logic unit (ALU), instruction code decoder nor any stack memory. There is no specific common data bus and addressing bus to be shared by most functional blocks of the control apparatus. A clock signal is not necessary unless required by a signal generator to generate a signal. Execution of an event can be instant without any delay caused by the instruction set related clocking circuit of a microprocessor. Due to the simple hardware structure, cost of the invented control apparatus is cheaper when compared with a regular microprocessor based controller.

The programming structure of the invention does not require the programming procedure to be in a sequential logical order as required in regular assembly language programming; nor any instruction set is to be learned by the programmer. The simple structure of the invention enables ordinary people to effectively program the control apparatus with minimal training.

By deleting the sound synthesizing function, the apparatus is reduced into a limited capability programmable control apparatus which can be used to interactively driving external components such as an array of LEDs or suitable motion transducers such as solenoids and motors.

Embodiments of the invention are particularly suited for use, for example, low cost programmable sound synthesizing apparatus which produces interactive sound effects as well as digital signals to drive external transducer devices. Such a programmable sound synthesizing apparatus is widely used as a key component in many electronic consumer products such as security system, talking clocks, electronic toys, door bells and seasonal gifts.

Additionally, embodiments of the invention find utility in many other applications, e.g. logic controller, interactive controllers and timer.

The novel features of the invention are set forth with particularly in the appended claims. The invention will be best understood from the following description when read in conjunction with the accompanying drawings.

BRIEF DESCRIPTION OF DRAWINGS

FIG. 1-*a* illustrates an embodiment of a programmable configuration table showing the configuration states to program the control apparatus.

FIG. 1-*b* illustrates the event paths corresponds to a qualified trigger of a configuration state in FIG. 1-*a*.

FIG. 2A is the flow chart of an application.

FIG. 2B-*a* illustrates the configuration states programmed according to the flow chart of FIG. 2A FIG. 2B-*b* is the event path corresponds to address E1 of FIG. 2B-*a*.

FIG. 3B-*a* illustrates the configuration states programmed according to the flow chart of FIG. 3A FIG. 3B-*b* are the event paths to work with the configuration states of FIG. 3B-*a*.

FIG. 4B-*a* illustrates the configuration states programmed according to the flow chart of FIG. 4A FIG. 4B-*b* are the event paths to work with the configuration states of FIG. 4B-*a*.

FIG. 10A-*a* and FIG. 10A-*b* in combination illustrates an embodiment of a programmable configuration table showing the timer programming function.

FIG. 10B-*a* and FIG. 10B-*b* in combination illustrates an embodiment of a programmable configuration table demonstrating the direct addressing function.

DESCRIPTION OF THE PREFERRED EMBODIMENTS

Figure 3A:
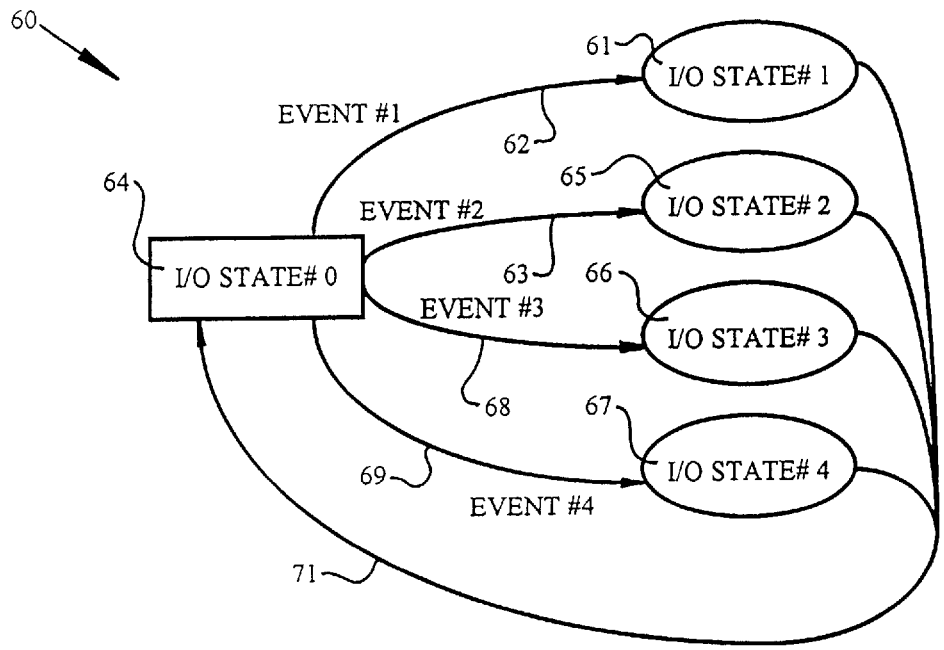
FIG. 3A is the flow chart of another application.

A simpler approach to understand the invention is to define the specification of a preferred embodiment of the programmable apparatus to be illustrated by the application examples and study the programming method to program the programmable sound synthesizer. The next step is to study several simple application examples. The description is then extended to the hardware embodiments of the invented control apparatus, method to fabricate the invention into an integrated circuit and finally a preferable embodiments of the program simulation and debug system.

The specification of a typical embodiment to be illustrated with the application examples is listed as follow:
1. The control apparatus comprises of eight programmable input/output terminals and one additional audio output terminal. The designation of each terminal is represented by a three bits binary number.
2. Each terminal can be programmed as an input terminal, an output terminal or a "don't care", high impedance terminal.
3. Each input terminal is programmed to response to a "qualified" characterized input trigger signal. Four typical characterized input signals are defined for the preferred embodiment as follow:
    (a) a signal characterized by a rising edge, represented by the symbol "R";
    (b) a signal characterized by a falling edge, represented by the symbol "F";
    (c) a signal characterized by a logic high level when the signal is sampled, represented by the symbol "1"; and
    (d) a signal characterized by a logic low level when the signal is sampled, represented by the symbol "0".
4. Each output terminal can be programmed to deliver an output signal. Three examples of output signals are defined as follow:
    (a) an output signal of logic high level represented by the symbol "H";
    (b) an output signal of logic low level represented by the symbol "L"; and
    (c) an output signal comprises of a six Hertz square wave pulses represented by the symbol "P".
5. The "don't care" high impedance state is represented by the symbol "X". Each terminal is to be specified as one of the eight possible states: R, F, 1, 0, H, L, P and X as defined above. Each of the eight possible I/O configurations of a terminal is represented by a three bit binary number.
6. There are maximum 16 possible I/O configuration states, designated as I/O State# 0 to I/O State# 15. Each I/O configuration state is represented by a 4 bit binary number. Only one of the I/O States is specified by the program to represent the I/O configuration of the control apparatus at a time. I/O State# "0" is defined as the default active I/O configuration state; that is the active I/O configuration state when the control apparatus is firstly powered up.
7. Whenever an input terminal of an I/O configuration state receives a qualified trigger signal, it is directed to execute a predefined event.
8. There are maximum 32 predefined events. Each event is represented by a 5 bits binary number.

It sold be noted that the ways an I/O terminal is configured and the maximum number of I/O states and events of the embodiment are exemplary. Although the number of I/O configuration states and events can be any flexible numbers; in practice, higher number requires more bits in the internal registers and memory data length, and therefore resulted in higher product cost. A just right number is preferred to be defined in the design of the control apparatus.

An example of the preferred programming method to program the programmable sound synthesizer is represented by the programming format of FIG. 1-*a* and FIG. 1-*b*, in accordance with the present invention. The programming format comprises of two fields. The first field is represented by Table 10 comprises of a first co-ordinate 12 listing all the eight I/O terminals and a second co-ordinate 11 listing all the I/O configuration states. Each element of the table represents the configuration of a terminal at a particular I/O configuration state. The first part of the programming process is to specify each element of the table with one of the eight symbols R, F, 1, 0, X, H, L, and P as defined. Whenever a terminal is configured as an input terminal, a numbered event is to be specified. This is the event to be executed when a qualified input signal is received. Element 13 "F:E 11" denotes the configuration of terminal 1 (Pin 1) of I/O State# 1, whereas "F" denotes that the qualification signal is characterized by a falling edge, E11 denotes Event# 11 is to be executed when a falling edge signal is received by terminal 1. Element 14 denotes that when a rising edge signal is detected by terminal 2, Event# 2 is to be executed. Element 15 "X" denotes terminal 6 is a don't care terminal. Whenever an input terminal is configured to "X", any trigger signal received by the terminal is ignored. Whenever an output terminal is configured to "X", the output terminal is configured to have a high output impedance.

Attention is now directed to Table 20 which comprises the second part of the programming format and defines the events to be executed. An event may comprise of one or more sub-events. Each event or sub-event when executed performs a task such as generating an output signal, modifying an active I/O configuration state, initiate a timer counter or direct the execution to another event. Table 20 enlists the detail contents of all the events to be executed according to Table 10. Line 21 denotes that Event# 1 comprises of three sub-events 22 (STATE# 1), 23 (SOUND 1), and 24 (EVENT# 1). Suppose I/O State# 0 is the active I/O configuration state; the reception of a rising edge signal by terminal 1 triggers the execution of Event# 1; that is, sub-events 22, 23 and 24 will be executed in order. Sub-event 22 denotes that the active I/O configuration state is changed from I/O State# 0 to I/O State# 1; then follow by the reproduction of the audio signal designated as "SOUND 1". When the reproduction of the sound is completed, sub-event 24 is executed which loop back the execution to "EVENT# 1" and replay "SOUND 1" for another cycle. The looping continues until anyone of Terminals 1 to 4 of I/O States# 1 receives a qualified signal. For example, when Terminal 1 detects a falling edge signal, the "SOUND 1" looping of Event# 1 is interrupted and Event# 11 is executed. Event# 11 instructs the controller to return to I/O State 0 as the active I/O configuration state and the "END" symbol denotes the end of the event and the control apparatus is in an idle mode awaiting the next qualified input signals to be received as defined by I/O State# 0.

At the power up of the control apparatus, an I/O configuration state is to be defined as the default power up I/O state; that is, the active I/O configuration state right after power up of the control apparatus. A convenient notation is to define I/O State# 0 to be the default power up I/O state.

It should be noted that each I/O configuration state has no sequential relationship with each other and table 10 can be arranged in any order. Similarly, any event listed in table 20 also has no sequential relationship with another event unless it is designated as the sub-event of another event as in Line 21. The events can be numbered in any order and the numbers can be skipped if desired by the programmer. All sub-events having sequential relationship are arranged in a single event line listing. This arrangement enables the programmer to have a much clearer picture of the program when compared with the multiple lines listing of regular assembly language programming.

Although the program table of FIG. 1-a and 1-b is organized into two fields as described, various modifications in format structure of the programming tables are possible while maintaining the simple to learn and easy tracibility nature of the invented programming method.

FIG. 2A, FIG. 2B-a and FIG. 2B-b illustrated another simple application example where one trigger pin of the control apparatus is programmed as an irretriggerable trigger input terminal. Line 41 of FIG. 2B-a denotes that Pin 2 to Pin 8 are all don't care terminals. Element 42 indicates that when a rising edge signal is received by Pin 1, Event# 1 will be executed. Table 50 indicates that Event# 1 firstly activates sub-event 51, which specified State# 1 to be the active I/O configuration state before "SOUND" 52 is generated. Line 45 of table 40 indicates that Pin 1 is changed to high impedance state during the time "SOUND" 52 is generated; therefore Pin 1 becomes a irretriggerable trigger pin. At the end of the sound playback, I/O State# 0 is designated as the active state and Pin 1 is ready to receive another qualified trigger signal.

The two I/O configuration states and Event# 1 can be represented by a signal flow chart as illustrated in FIG. 2A. Each of I/O State# 0 and I/O State# 1 is represented by a block. The rectangular shaped block 31 denotes that I/O State# 0 is a steady state. The elliptical shaped block 34 denotes I/O State# 1 is a transition state. Arrow line 32 indicates that the active state is switched from I/O State# 0 to I/O State# 1 according to the instruction of sub-event 51 of Event# 1 in Table 50. Arrow line 33 represents sub-event 53 which returns the active status to I/O State# 0 after "SOUND" 52 is reproduced.

FIG. 3A, FIG. 3B-a and FIG 3B-b illustrated another application example in which the control apparatus is defined to have four trigger terminals (Pin 1 to Pin 4) programmed to trigger four different sounds (SOUND# 1 to SOUND# 4). During the time a sound is playback, the corresponding trigger terminal is irretriggerable by the trigger signal of itself but will be interrupted and retriggered by the qualified trigger signals received by the other input terminals.

Line 77 of FIG. 3B-a denotes that Pin 5 to Pin 8 are all don't care terminals. Element 74 indicates that when a rising edge signal is received by Pin 4, Event# 4 will be executed. Table 80 indicates that Event# 4 firstly activates sub-event 82, which specified I/O State# 4 to be the active I/O configuration state before "SOUND# 4" 83 is generated. Line 78 of table 70 indicates that Pin 4 is changed to high impedance state during the time "SOUND# 4" 83 is generated; therefore Pin 4 becomes a irretriggerable trigger pin. Line 78 also instruct Pin 1 to Pin 3 to retain the triggerability such that any qualified trigger signal received by Pin 1 to Pin 3 will interrupt the playback of "SOUND# 4". At the end of the sound playback, State# 0 is designated as the active state according to sub-event 84 and Pin 4 is ready to receive another qualified trigger signal.

The five I/O configuration states and four events can be represented by a signal flow chart as illustrated in FIG. 3A. Each of I/O State# 0 to I/O State# 4 is represented by a block. The rectangular block 64 denotes that I/O State# 0 is a steady state. The elliptical blocks 61, 65, 66 and 67 denotes I/O State# 1 to I/O State# 4 are transition states. Arrow line 69 indicates that the active I/O state is changed from I/O State# 0 to I/O State# 4 according to the instruction of sub-event 82 of Event# 4 indicated in Table 80. Arrow lines 71 represents sub-event 84 which returns the active status to I/O State# 0 after "SOUND# 4" 83 is reproduced.

The flow charts of FIG. 2A and 3A are closely correlated to the contents of the programming tables 40, 50, 70 and 80 respectively. In more complicated applications, user will find that it is very helpful to firstly sketch a flow chart, give a meaningful name to every I/O configuration states and events rather than a designated number. Define the number of I/O configuration states and events required according to the flow chart; and finally fill up the I/O Configuration Table and the Event List as illustrated by the interconnected arrow lines of the flow chart.

Figure 4A:
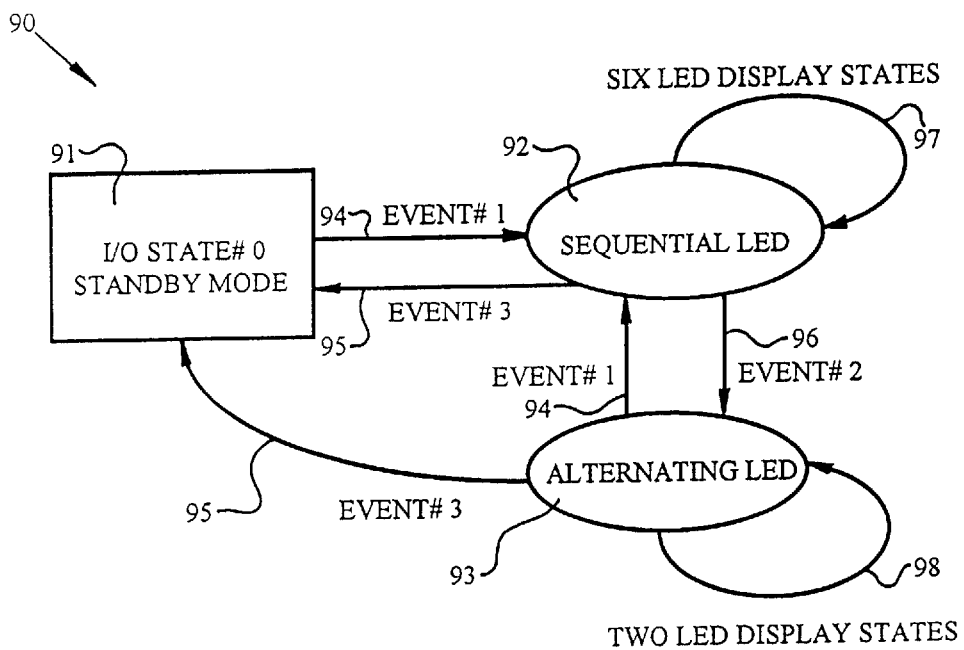
FIG. 4A is another flow chart of another application.

FIG. 4A, FIG. 4B-a and FIG. 4B-b illustrated another application example where the control apparatus is defined to have two trigger terminals (Pin 1 and Pin 2) and six outputs terminals (Pin 3 to Pin 8); each of the output terminal is connected to drive a LED. The six LEDs are connected in a row to show blinking effect. Pin 1 is firstly triggered to start the sequential blinking of the row of LEDs such that each LED is turned on for 0.5 second in sequence. When Pin 1 is trigger again, the control apparatus is changed to the second blinking mode such that three alternate LEDs are all turned on for 0.5 second at a time. Subsequent triggering of Pin 1 will toggle the two blinking modes. The blinking process will continue until Pin 2 is triggered.

It is easier for an user to program this application example by firstly working out a flow chart as illustrated in FIG. 4A. The rectangular block 91 designated I/O State# 0 as a steady state which represents both as the power up state and the standby mode. When a qualified trigger is received, the sequential LED blinking mode 92 is started through arrow line 94 which represents the starting of Event# 1. The looping process 97 comprises of six different LED output states. Each state of the looping process 97 lights up a different LED in sequence for a 0.5 second time period. Upon receiving of a stop pulse by the Pin 2, the blinking sequence will be interrupted and the active state is returned to I/O State# 0 through Event# 3 as indicated by arrow line 95. If a subsequent qualified signal is received by Pin 1, the looping process 97 is interrupted and switch over to the alternating blinking mode 93 through the Event# 2 as indicated by arrow line 96. The looping process 98 of the alternating blinking mode comprises of two LED output states. Each of the state lights up three LEDs for a period of 0.5 second. When the trigger pulse is received again, the blinking process is switched back to sequential blinking mode 92 through Event# 1. If a stop pulse is received, the active state is switched to block 91 through Event# 3 and the control apparatus returns to standby mode.

It can be observed from the flow chart that the programming process requires nine I/O configuration states. I/O State# 0 represents the power up I/O configuration state as well as the standby mode. Six I/O configuration states are required for the sequential LED blinking mode and two I/O configuration states are required by the alternating LED blinking mode. Besides three events are to be defined. Event# 1 directs to the sequential LED blinking mode, Event# 2 directs to the alternating LED blinking mode and Event# 3 directs to the standby mode.

The teaching of the flow chart FIG. 4A is directed to the construction of the tables 100 and 120. Instead of designating each I/O configuration state and event by a number, a meaningful name is designated to each I/O configuration state and event. Similarly each I/0 terminal is also named to facilitate the programming process. In the table 100, pin 1 is named as the toggle pin and designated by "TG", Pin 2 is the "OFF" terminal to stop the blinking process. Pin 3 to Pin 8 are designated as LED1 to LED6 to indicate that these terminal pins are connected to LED 1 to LED6 respectively. I/O State# 0 is designated as the "STANDBY MODE" as indicated by element 102. I/O State# 1 is designated as "LED 1 ON" as indicated in element 101. I/O State# 7 is designated by the name "ALT 1" as indicated by element 101 to represent the first alternating LED light up pattern. I/O State# 8 is designated by the name "ALT 2" as indicated by element 111 to represent the second alternating LED light up pattern.

Upon power up, I/O State# 0 is defined as the Power Up active I/O configuration state. Only Pin 1 is enabled to detect a rising edge qualification signal. All the other terminals are in high impedance state. As directed by the coding element 107, upon receiving of a qualified trigger signal by Pin 1, Event# 1, 121 is executed which initiates the active I/O State to be switched over to I/O State# 1 as instructed by sub-event 122; and step by step to I/O State# 6 accordingly. Each I/O configuration state is maintained by a delay time of "DELAY 0.5" until another I/O configuration state takes over control. According to I/O State# 1, only LED1 is turned on for 0.5 seconds. The looping process is repeated from Pin 4 to Pin 8 until a qualified trigger signal is received by Pin 1 or Pin 2. It should be noted that during the looping process of I/O State# 1 to I/O State# 6, any qualified signal received by Pin 1 directs to Event# 2 124 which in turn switching between I/O State# 7 and I/O State# 8. Three alternating LEDs indicated by 112 are turned on at a time until another qualified signal is received by Pin 1 or Pin 2. It should be noted that when a rising edge signal is received by Pin 2 during the I/O State# 1 to I/O State# 8, Event# 3, represented by line 125 is executed to return the active state to the standby mode of I/O State# 0 as directed by sub-event 127.

The architecture of the programming method provides a built-in structural approach for unskillful programmer without any structural programming concept or understanding of microprocessor architecture to systematically program an application. The programming process can be started with a flow chart which is easy to learn, simple to construct and does not contain any sophisticated design rules to follow. The actual programming process involves filling up of specifications grouped into two table according to the flow chart established. There is no binary or hex numbers to manipulate, no memory map I/O concept to learn, no memory overflow or other kinds of restrained conditions to worry, no entry point or program counter to pay attention and no instruction set to remember. Besides, instruction set which usually comprises of line by line instruction codes and one or more operands are avoided. This programming method is very user friendly to those ordinary people confused by the instruction set such as "LOAD R1, 64H", or "JUMP LINE 4FFH". More important, the structure of the simple flow chart is directly integrated into the actual programming process, the filling up of the tables which by nature provides a clean cut structure of the program flow. The status of each I/O terminals in different I/O configuration states is well organized and clearly enlisted together to facilitate tracing of the logic flow. Normally the complete program can be listed on a single page of paper which is of great help for ordinary people to master the full picture of the program.

It should be noted that the simple programming method invented can be applied to program existing microprocessor based control apparatus by designing a translation program to translate the programmed data of the two tables into another programming language to be interpreted by the microprocessor based control apparatus.

From the foregoing, it should be appreciated that the preferred embodiment of the programming method have been disclosed herein to facilitate systematic programming of the control apparatus by ordinary people.

Figure 5:
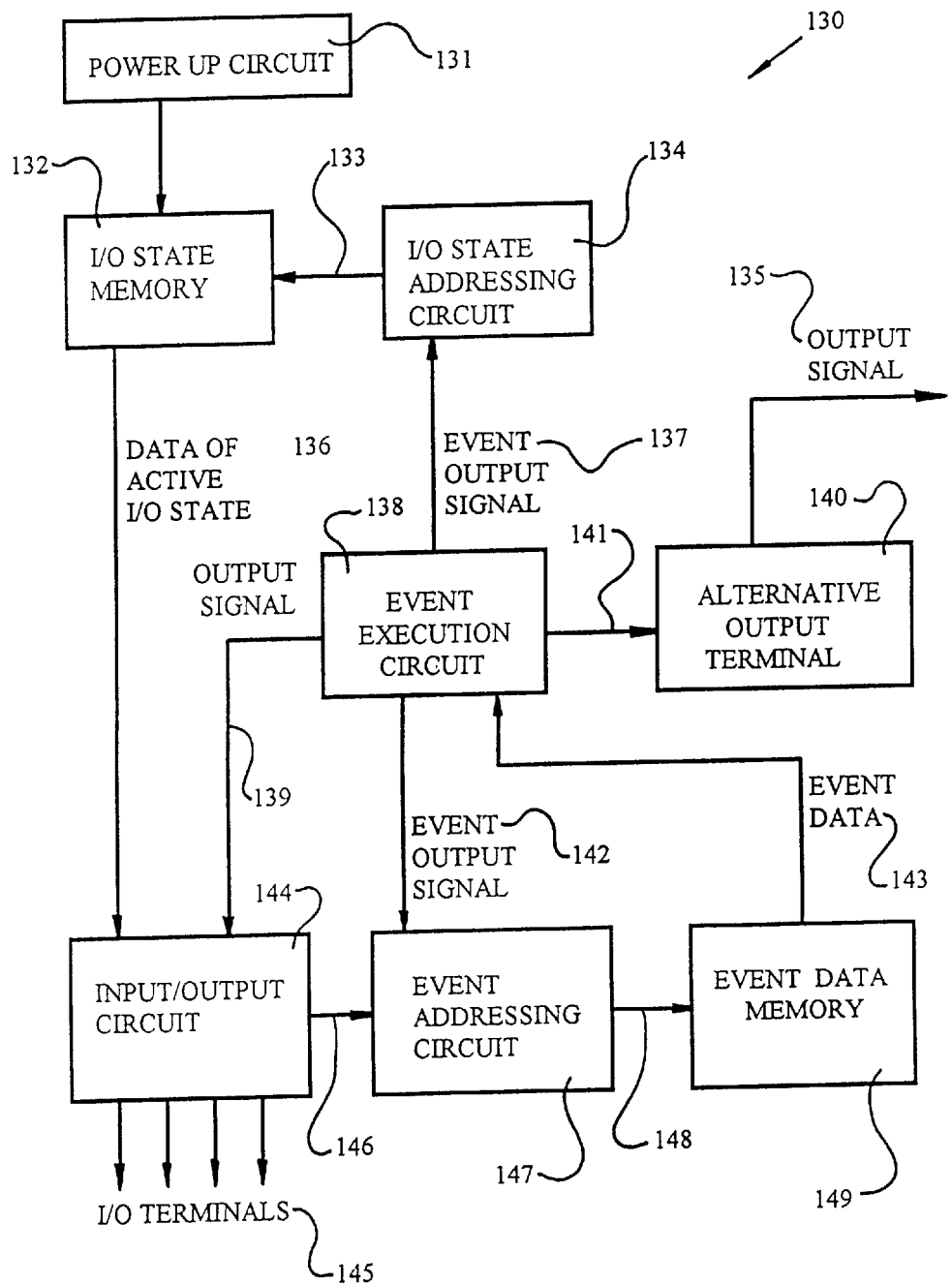
FIG. 5 is a block diagram to show the structure of the hardware.

A preferred embodiment of the hardware design closely correlated with the disclosed programming method is illustrated in FIG. 5. To facilitate the description of the hardware embodiment and the relationship with the programming method, the specification of the programmable control apparatus set forth for illustrating the programming method is adopted. It is understood that the coverage and applications of the invention is not limited by this specification. Input/output circuit 144 comprises of eight terminals 145 as defined in the programming method application example; the control circuit to configure the status of each terminal; the driver circuit to drive a signal when the terminal is configured as an output terminal and the qualification circuit to detect a trigger signal when the terminal is configured as an input terminal.

The input/output circuit 144 receives control signals from I/O configuration state memory (I/O state memory) 132 to configure the I/O terminals 145 into one of the 16 maximum possible states. I/O configuration state memory comprises of 16 pages of memory, each page of memory represent one I/O configuration states containing the data required to configure each of the eight I/O terminals 145. Upon power up of the control apparatus, power up circuit 131 activates one of the 16 pages of I/O configuration state memory 132 as the default I/O configuration state or active I/O configuration state and this page of data is sent to the input/output circuit to configure the I/O terminals.

Upon receiving of a qualified trigger signal, the corresponding event address information obtained from I/O state memory 132 is sent to the event addressing circuit 147. The starting address of the corresponding event data memory 149 is set up at address bus 148 and the event is executed upon the control of the event execution circuit 138. The event execution circuit 138 analyzes the event and sub-event information contained in the corresponding event data memory 149 and reacts accordingly. A sub-event to generate a sound will activate the sound reproducing circuit located inside the event execution circuit. The resulted audio signal is generated as an output signal 135 through the signal path 141 and the alternative output terminal 140. Alternatively an output signal such as a six Hertz pulse train may be generated as defined by the "P" I/O configuration code. This pulse train is transmitted through one of the I/O terminals 145 and the signal path 139. When a sub-event requires the operation to initiate another event such as in sub-event 24 of FIG.1-b, the event execution circuit interfaces the information to the event address circuit 147 and the new event is initiated accordingly.

When a sub-event requires the operation to activate another input/output configuration state such as in sub-event 22 of FIG. 1-b, the event execution circuit interfaces the information to the I/O state addressing circuit 134 so as to activate another page of I/O state memory 132 through the control path 133.

Figure 6:
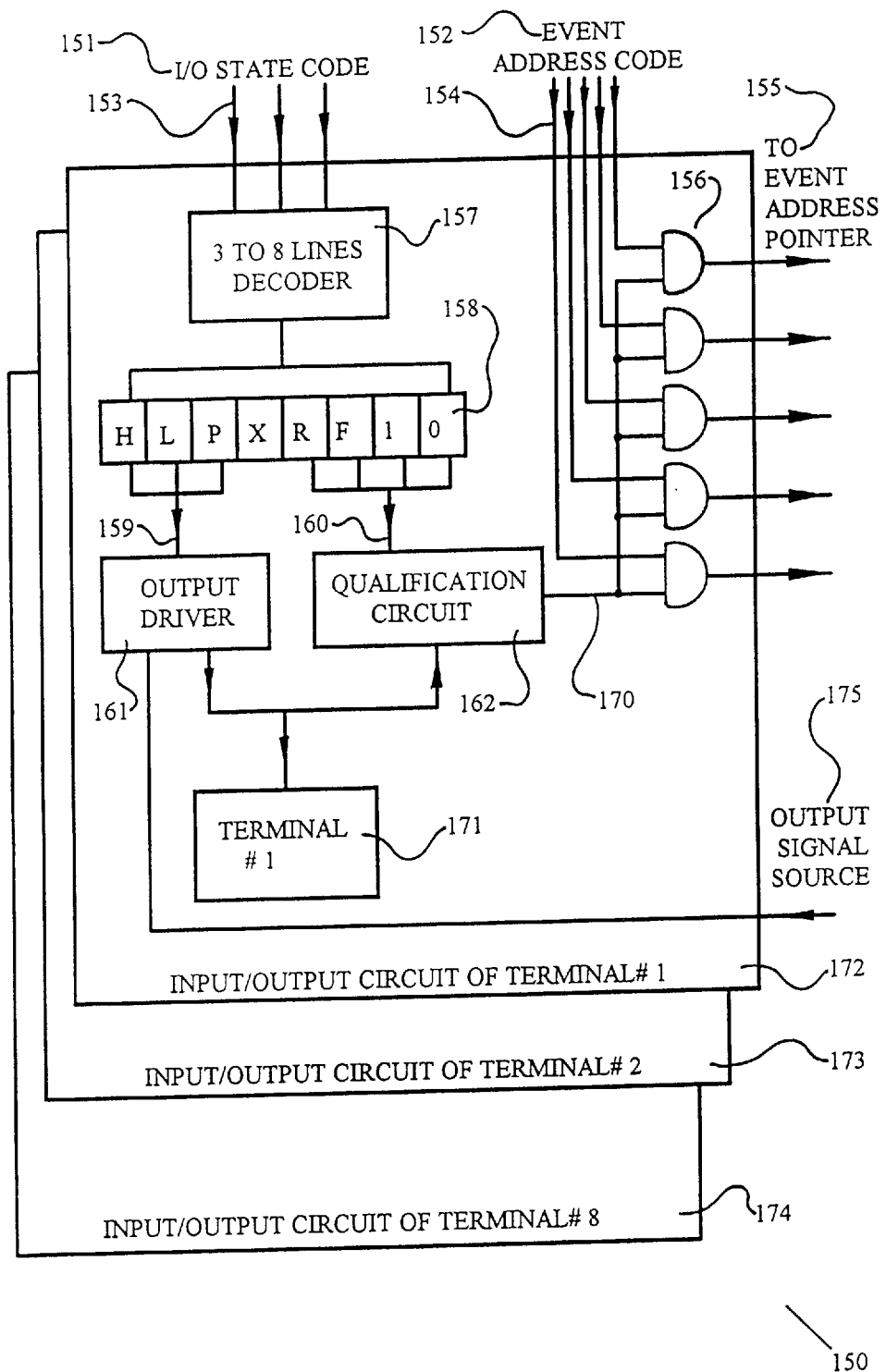
FIG. 6 is a circuit diagram to show the structure of a typical input/output circuit.

FIG. 6 depicts a detail circuit diagram of the input/output circuit functional block 144 illustrated in FIG. 5. Circuit 172 illustrates an input/output circuit of terminal 1. There are seven identical circuit 173 to 174 correspond to terminals 2 to 8 respectively as defined by the specification of the embodiment illustrated. Each terminal of the input/output circuit receives a 3 bit code 151 from the input/output configuration state memory 131 to define the configuration of the terminal. The 3 bit code is decoded to select one of the 8 possible input/output configurations 158 by the 3 to 8 lines decoder 157.

Qualification circuit 162 is designed to be responsive to the characterized signals defined by the "R", "F", "1" or "0" input configuration codes. When the terminal is configured as an input terminal by one of the input configuration codes "R", "F", "1" or "0", an enable line 160 corresponds to the input configuration selected activates the corresponding portion of the qualification circuit 162 to monitor the signal received from the terminal pad 171. If a qualified trigger signal is detected, the qualification circuit enable line 170 enables the corresponding event address pointer code to be passed to the event addressing circuit 147 of FIG. 5 through the logic circuit 156. The event address pointer code 152 obtained from the I/O configuration state memory 131 of FIG. 5 is a 5 bit code to address 32 different events as defined in the design specification of the example apparatus.

If the terminal is configured as an output terminal by the "H", "L" or "P" codes, the qualification circuit is usually disabled unless there is a special purpose design which requires the terminal to serve as both an input and output terminal at the same time. The output driver 161 provides a properly driven output signal to the terminal pad 171 according to the control signal 159. If the output signal is a waveform signal other than "H" or "L" levels, such as the 6 Hz pulses defined in the design specification, an output signal source is required to provide the waveform signal to be transmitted through the terminal pin. In the example, a 6 Hz signal is sourced either from the event execution circuit 138 or from an independent oscillator circuit. This signal is conducted to the terminal pad 171 when the "P" code is selected. It should be note that the design enables an audio signal to be generated through anyone of the input/output terminal in addition to the alternative terminal 140 of FIG. 5.

If the terminal is configured as an input line, the output driver circuit is usually disabled. If the terminal is configured with a don't care status or high impedance state designated by the symbol "X", both the qualification circuit and the output driver circuit are disabled. In order to reduce cost of the control apparatus, some terminals can be specified as input only terminals so as to save the cost of the output driver circuit; while some terminals are specified as output only terminals to save the cost of the corresponding qualification circuit.

It should be noted that the eight I/O configurations specified are exemplary, any qualifying circuit and output signal generator of specific function can be added to enhance the power of the control apparatus. For example, the detection of a DTMF tones can be added as a qualification circuit and a frequency sweeping signal can be generated as an output signal in case the control apparatus is used as a programmable test equipment for the testing of telephone products.

Figure 7:
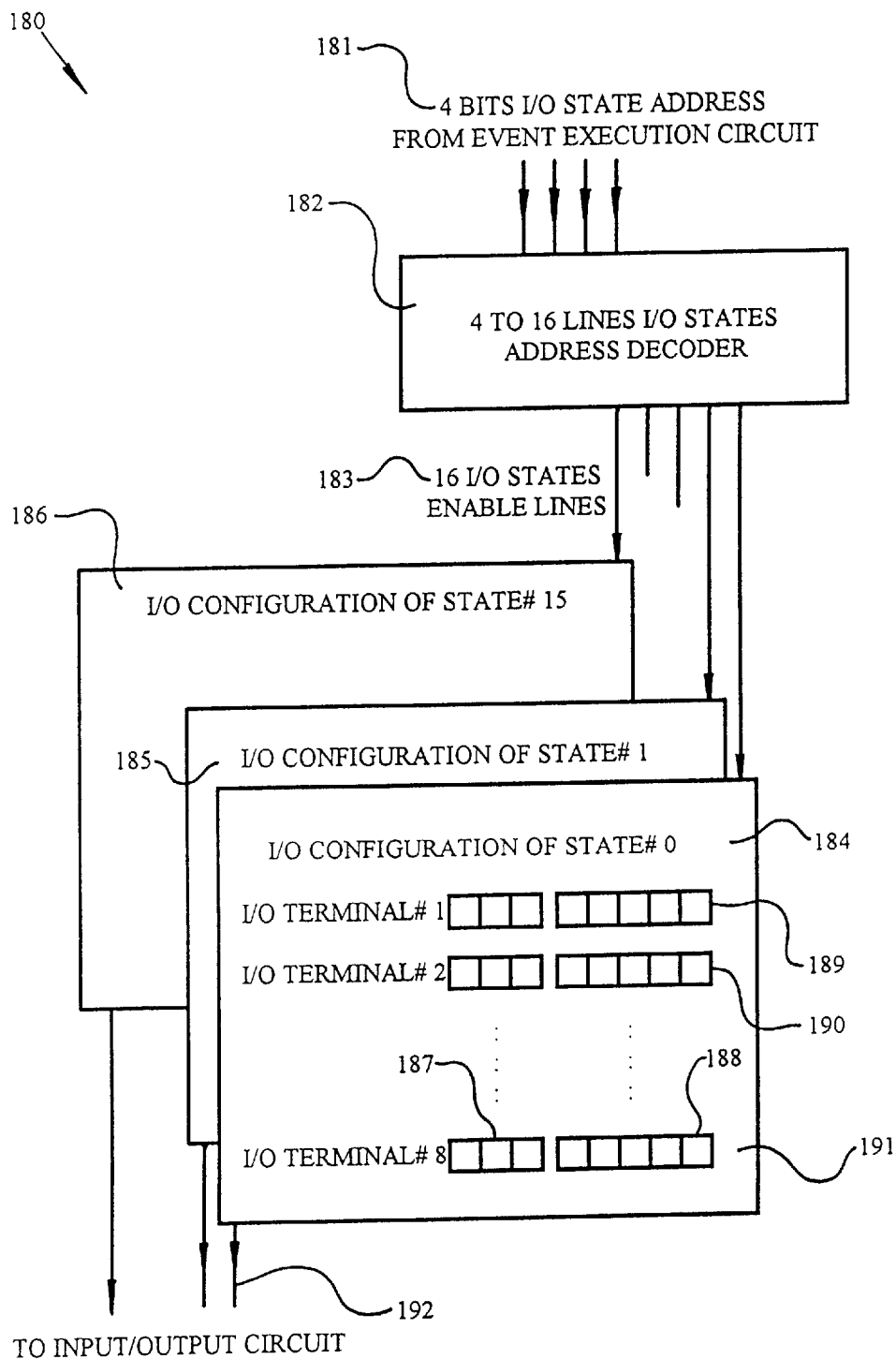
FIG. 7 is a circuit diagram to show the typical structure of I/O configuration state memory and the addressing circuit.

Attention is now directed to FIG. 7 which illustrate a preferred embodiment of the input/output configuration state memory 132 and I/O addressing circuit 134 of FIG. 5. Memory 184 comprises a page of data required to configure the eight I/O terminals for I/O configuration State# 0. This page of memory comprises of eight bytes of data to configure eight terminals. The first three bits of each data byte representing the eight I/O configuration combinations define the I/O configuration of a terminal and is connected through the data bus 192 to the 3 to 8 lines decoder 157 of FIG. 6. The last five bits represent the thirty two event starting addresses. The five bits data are connected through the data bus 192 to the logic circuit 156 of FIG. 6 to be transmitted to the event addressing circuit when a qualified input trigger is received. Since the 3 bits data and the 5 bits data are working in pairs, they are more convenient to be parts of the same word as illustrated by the preferred embodiment, or arranged in different memory blocks to be accessed by the similar operation principle.

If an I/O terminal is configured as an output terminal, the content of the 5 bit data is not relevant to the event addressing circuit. In this case, the 5 bit data can be used to further define the output characteristics of the output signal such as the scale factor to adjust the amplitude of the output signal. In an alternate embodiment, the first 3 bits of data can be configured to define one output flag and seven input configurations. When the output flag is detected, the remaining 5 bits of data is used to specify which kind of output signal is to be generated. This arrangement effectively expands the number of input/output configurations to be addressed by the 8 bits format without further increasing memory size but requires more hardware to decode the first 3 bits of memory and refer the control to the second 5 bits of memory when the output flag is detected.

The embodiment 180 comprises of 16 pages of I/O configuration state memory to represent the 16 different programmable I/O configuration states. Only one of the I/O configuration states is specified as the active I/O configuration state at a time. As mentioned before, it is convenient to hook up I/O State# 0 as the power up default I/O configuration state. The I/O state addressing circuit 134 of FIG. 5 can be represented by the 4 to 16 lines decoder 182 of FIG.

7 or a 16 bits latch. Whenever the event execution circuit receives a new active I/O configuration state address, the information is fed to the decoder 182 which in turn decodes the address and enable one of the 16 pages memory to become the active I/O configuration state memory. This page of memory is then downloaded to the input/output circuit for configuring the I/O terminals.

Figure 8:
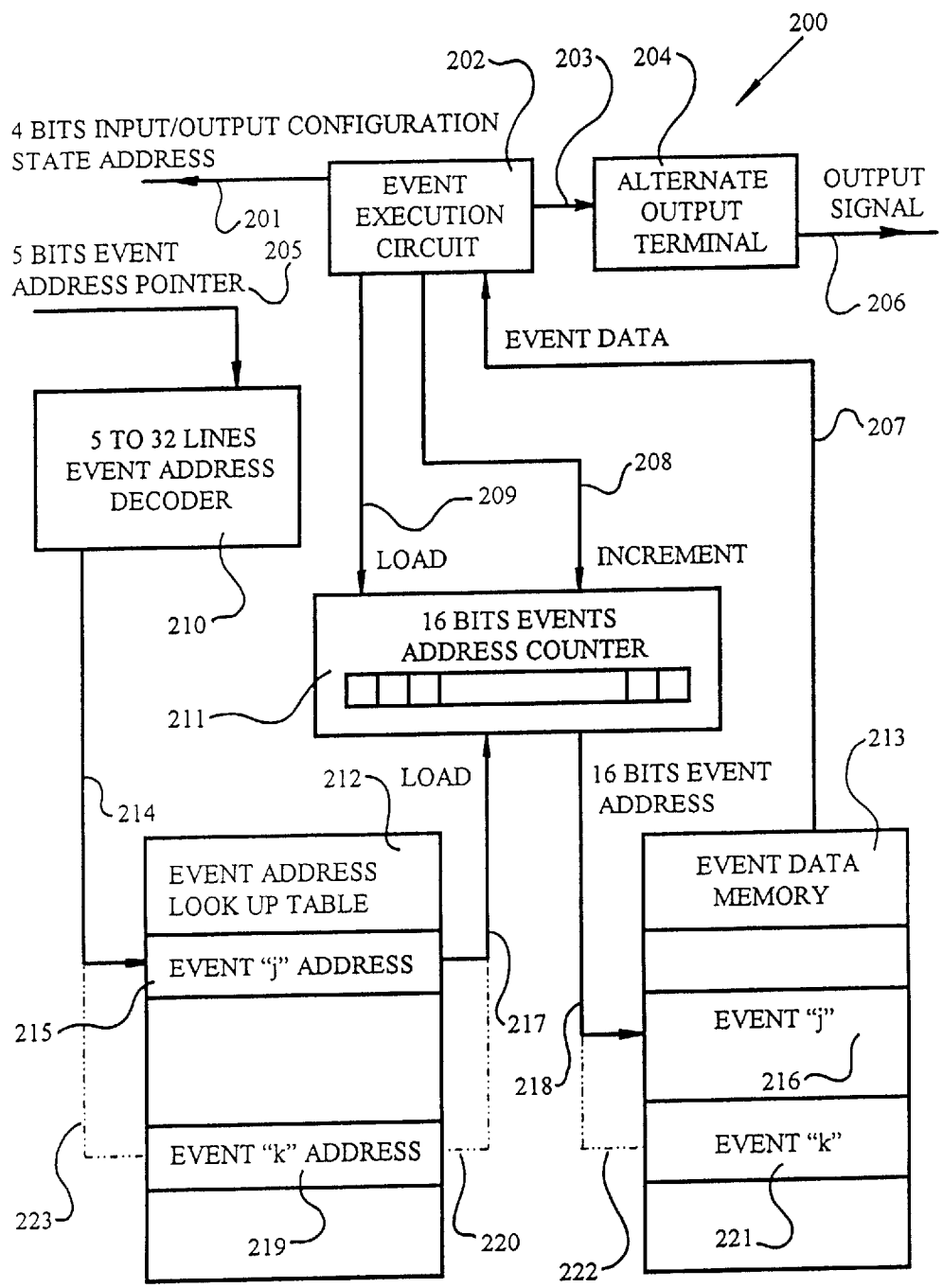
FIG. 8 is a circuit diagram to show the interfacing of typical event data memory, event execution circuit and the related addressing circuit.

FIG. 8 illustrates an embodiment of the event data memory, event execution circuit and related addressing circuit. The 5 bits event pointer 205 is fed to a 5 to 32 lines address decoder which in turn picks up one of the 32 event starting addresses stored in the look up table 312. Each event starting addresses defines the starting point of an event located in the event data memory 213. This starting address is loaded into the event address counter 211 and initiates the event execution circuit 202 which generates output signals according to the data obtained from the event data memory 213. The event execution circuit 202 comprises of various generic circuits well known to the art according to the requirements of the control apparatus. In the example of a voice synthesizing controller, the event execution circuit comprises of the hardware circuit required by a regular sound synthesizer chip such as PCM decoder, digital to analog converter and the data stored in the event data memory are the encoded/compressed sound data and the related timing data. Alternative embodiment of the event execution circuit may comprise of DTWF tone generators, musical notes generators and any other signal manipulation or generation circuit required by the specific applications of the control apparatus. In these cases, the event data memory stores the data describing the signals to be generated. The output signal generated by the event execution circuit is coupled to the alternate output terminal 204 or to the output driver 161 of FIG. 6.

If the event data memory comprises a sub-event directed to the execution of another destination event as indicated by sub-event 24 of FIG. 1-b, the address of the destination event is loaded into the address counter 211 by the event execution circuit 202 through path 209 to initiate the execution of the destination event. If the event memory comprises of a sub-event directed to activating another input/output configuration state as indicated by sub-event 22 of FIG. 1-b, the 4 bits input/output configuration state addressing signal is transmitted through path 201 to the address decoder 182 of FIG. 7 to activate the desirable page of input/output configuration state memory.

The 5 to 32 lines event address decoder 210 and the event address look up table 212 can be replaced by another memory of 5 bit address and "q" bits data where the "q" bits represents the address length of the event data memory which is usually longer than 5 bits. The line decoders are used to save memory space and trace routing overhead when the circuit is fabricated into the actual integrated circuit. Similarly the 3 to 8 lines decoder 157 of FIG. 6 can be eliminated by using a 8 bit memory to directly configuring the I/O terminals; and the 4 to 16 lines decoder of FIG. 7 can be replaced by a 16 bits memory or a 16 bits shift register to select one of the 16 pages of I/O configuration state memory.

In the simplest embodiment of the event execution circuit, the event data memory 213 of an event can be a single word of memory data to specify which hardware generator of the event execution circuit is to be switched on and to specify the address of the event to be followed. In this case the event address counter 301 and the clock circuit to increment the counter through path 208 is not required. In the case of the sound synthesizer chip, a clock is required to successively fetch the encoded signal samples and to control the digital to analog converter. In a more sophisticated embodiment, the event execution circuit 202 may include a microprocessor based structure. Although the overall hardware cost is then not much reduced, the embodiment of the invention provides instant response to input triggering. Besides, the invention supports the microprocessor and relieve it from polling the I/O terminals, as a result, the overall response time is further improved. More important, the structure effectively supports the programmers with the innovative user friendly programming method.

In mass production, the embodiment as shown in FIG. 5 to FIG. 8 are to be fabricated into an integrated circuit (I.C.). A simple decoding process is required to convert the programmed data of the application, such as the tables 100 and 120 of FIG. 4B-a and FIG. 4B-b, into binary data to be stored in the input/output configuration state memory 132, event data memory 149 of FIG. 5 and the look up table 302 of FIG. 8. Following the standard process of fabricating an integrated circuit, these binary data is first transferred into a photo mask and the resulted photomask is then used to fabricate the integrated circuit through the regular integrated circuit fabrication process. Normally in mass production, the input/output configuration state memory 132, event data memory 149 of FIG. 5 and look up table 212 of FIG. 8 are fabricated as read only memory (ROM). In the situation of program development process, a special integrated circuit comprising of read and write memory (RAM), erasable programmable read only memory (EPROM and EEPROM), or one time programmable read only memory (OTP) to substitute the above mentioned read only memory is desirable to experiment the program and to provide a demonstration sample without going through the expensive and time consuming complete I.C. fabrication process. The converted program data is then downloaded into these memory area through an external data source.

Figure 9:
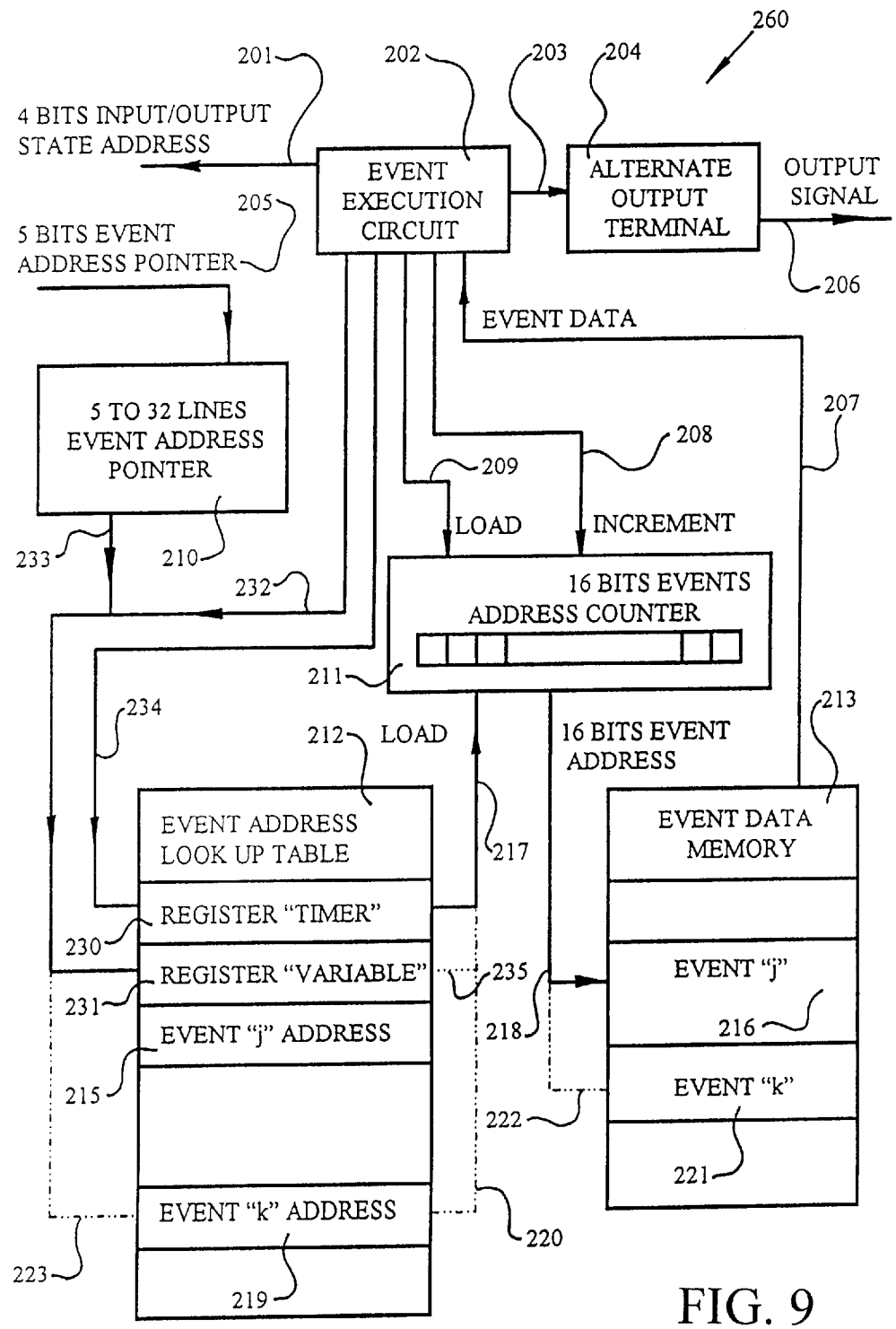
FIG. 9 is an enhanced circuit diagram of FIG. 8.

In order to enhance the programmable features of the control apparatus, a limited amount of read and write memory (RAM) or register is desirable to be added to the above mentioned programmable memory areas. FIG. 9 illustrated an embodiment basically identical to the embodiment of FIG. 8 except two read and write registers are added to the event look up table 212. The first register is named "TIMER" register and is used to designate the event to be executed upon the end of a timer counting. The strobe line 234 which activates the "TIMER REGISTER" 230 obtains the time out signal from the timer counter locates in the event execution circuit 202. When programming the event table, a sub-event can be designated in the format as shown in FIG. 10A-b to activate the timer counter:

According to the programming of EVENT# 1 291, sub-event 293 "TIMER 6 SEC: EVENT# 3" is of identical operation when compared with the former timing format "DELAY 0.5 SEC" demonstrated in table 120 of FIG. 4B-b except this time a timer runs in parallel with the following sub-event 294 and it initiates the execution of EVENT# 3 upon the end of the 6 second timing period. It is also be desirable to restart the timer or to stop the timing operation during the period the timer is running. The re-initiation is simply achieved by re-addressing the "TIMER t SEC: EVENT# k" sub-event. To stop the timer counter requires another sub-event designated as "TIMER OFF".

Read and write register 231 enables an event to be indirectly addressed. This feature allows the destination address of an event to be changed from time to time according to the requirements of the program flow. When programming the event table, a sub-event can be designated in the way as shown in FIG. 10B-b to activate the indirect address of an event. EVENT# 1 311 defines the address of the "variable event" when a rising edge is firstly received by Pin 1, 304 according to the coding element 305. Every time when TG 1 is triggered, EVENTS# 4 317 is executed. EVENT# 4 firstly turns off all trigger pins and then playback a horn sound. After that another sound is playback according to the address of the "variable event". When the variable event is defined to be equal to EVENT# 2 as in EVENT# 1, a period of siren sound is then generated. It can be observed that EVENT# 2 redefines the "variable event" to be EVENT# 3 316, therefore next time when Pin 1 receives a qualified trigger signal and EVENT# 4 is executed, the horn sound will be followed by a engine run sound as directed by EVENT# 3 316.

Whenever an EVENT# VAR=EVENT# k format is received, the address of the EVENT# k is placed into the "variable event register" 231 of FIG. 9. When EVENT# VAR is addressed at a later time, the event addressed by the content of the "variable event register" 231 will be executed.

Figure 11:
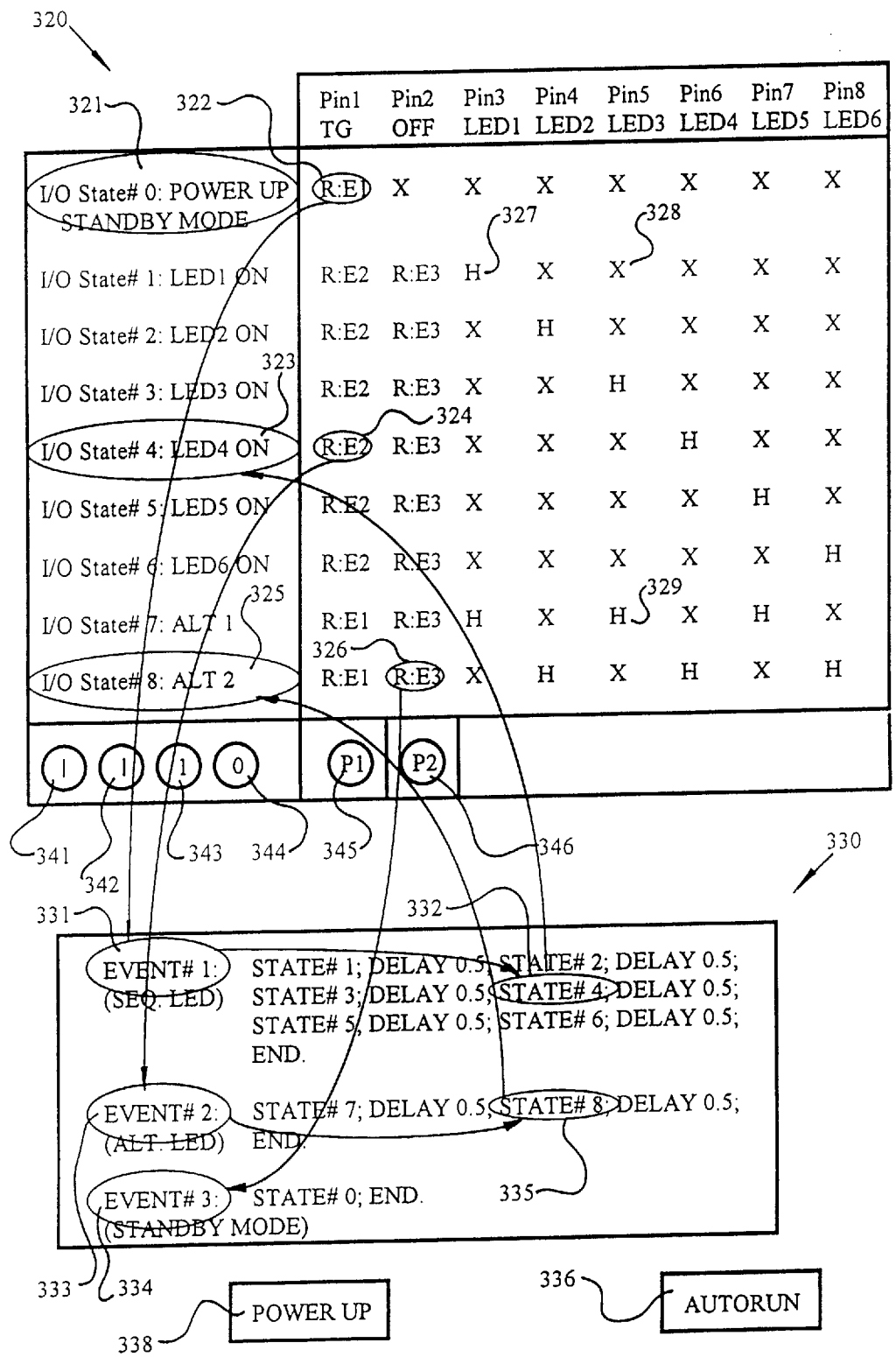
FIG. 11 is a typical screen display to simulate the program flow for the debugging of the program configuration table.

The simple single page program facilitates the debug process of the programming process. FIG. 11 described the preferred embodiment of a debug tool in which the whole program is displayed on a video screen and the program flow is simulated to facilitate the interactive debugging process. The active I/O configuration state and the event under execution are always high lighted on the screen. The trigger pin buttons 345, 346 and the qualifying signal buttons 341, 342, 343 and 344 are designed for the programmer to simulate triggering an input pin. When the control apparatus is power up by triggering the "power up" button 338, I/O State# 0 321 is highlighted. Pin 1 is then triggered by triggering the P1 button 345 and the rising edge button 341. The sub-events of EVENT# 1 is then high lighted one by one according to the logic flow and the high light region of table 320 changes according to which I/0 configuration state is specified to be active. Suppose sub-event 332 is executed, I/O State# 4 323 is then becoming the active state and high lighted. When Pin 1 is triggered at this time, the program flow is interrupted and EVENT# 2 is then executed. An autorun button 336 enables the simulator to automatically try all the possible program run combinations by automatically trigger the qualifying input pins one by one. Any open end program flow or closed loop is enlisted one by one after the autorun process is completed. The programmer will then be able to examine if the open end program flow or closed loop is desirable.

This simulator debug tool can be easily modified into a real time in circuit emulator by connecting the eight I/0 pins through an interfacing circuit of the development system with the outside application circuit. Similar to the programming method, the preferred embodiment of the debug tool is an extremely user friendly debug tool to support the programmer as the logic flow is clearly high lighted on the screen and traced step by step in the similar manner as in the real application. Besides, no complicated simulator or in circuit emulator control instruction is to be learned by the user.

Figure 12:
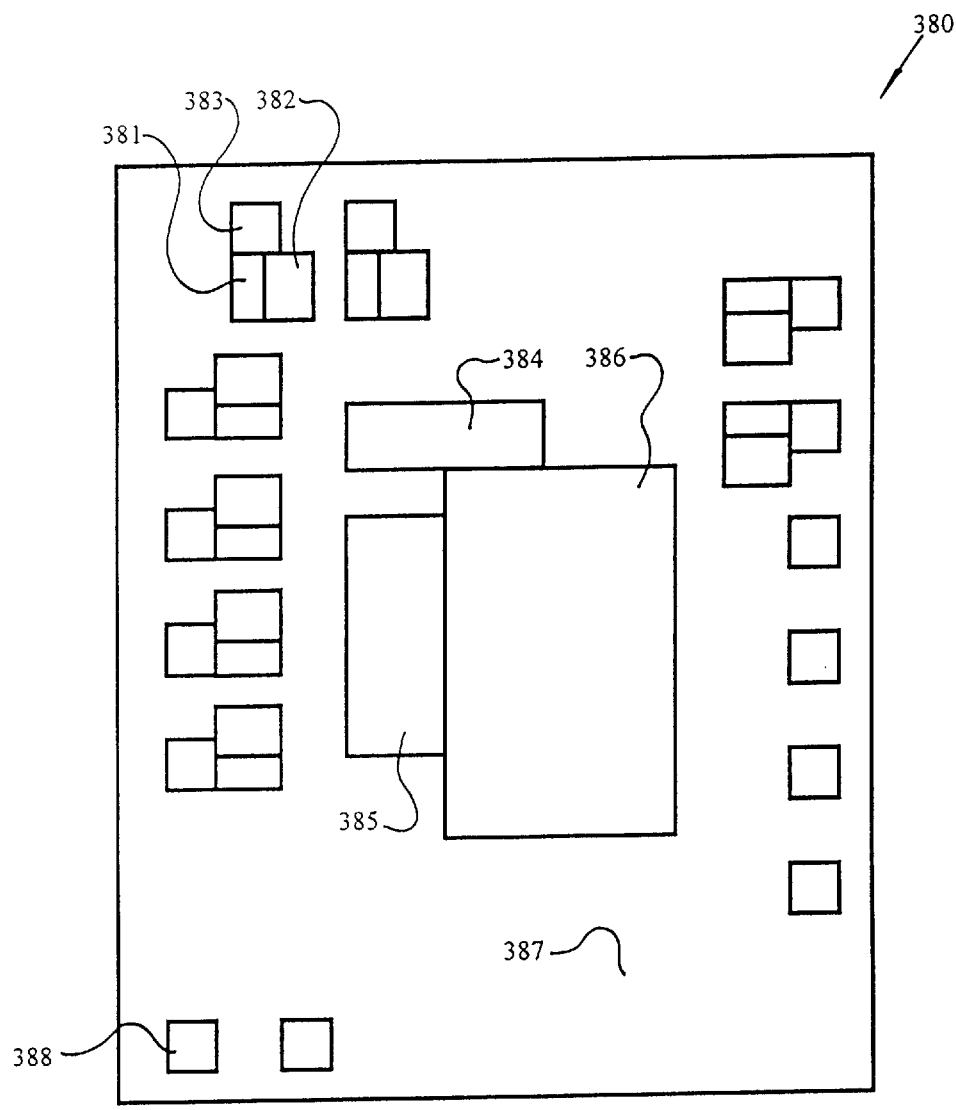
FIG. 12 is an example of layout design to show the locations of the I/O configuration state memory inside an integrated circuit.

Because of the unusual memory structure of the preferred embodiment, in the actual layout of an integrated circuit, the input/output configuration state memory is preferable to be separated from the main event memory so as to reduce the interconnection tracing overhead when laying out the actual integrated circuit. The location of the input/output configuration state memory is preferable to be broken down into different small memory blocks according to the number of addressable input/output terminals. For example, as illustrated in FIG. 7, the first byte memory of every page is related to terminal# 1 as shown in FIG. 12. It is preferable to group all the first byte of the 16 pages (16 I/O configuration states) 184 to 186 together and position the memory close to terminal 1 or the related output driver 161 and qualification circuit 162 as shown on FIG. 6. Area 381 represents the first byte of the 16 pages of I/O configuration states 184 to 186 of FIG. 7. Area 386 represents the main event memory which is separated from the input/output configuration state memory distributed proximate to the corresponding terminal bonding pads. This arrangement reduces the chip size of the integrated circuit and thus offers cost advantage to the manufacturer and the user. This economical structure of an integrated circuit can be modified to a microprocessor based control apparatus. The microprocessor is to be modified to comprise of additional blocks of memory dedicated to define the configuration of the I/O terminals.

From the foregoing, it should be appreciated that the hardware embodiments of the control apparatus have been adequately disclosed herein enabling electronic circuit engineers to develop a low cost programmable apparatus and to effectively interact with the user friendly programming method invented.

The preferred embodiments of the invention described herein are exemplary and numerous modifications, specification variations and circuit rearrangements can be readily envisioned to achieve an equivalent result, all of which are intended to be embraced within the scope of the appended claims.

What is claimed is:

1. A programmable control apparatus minimally comprising:

k terminals, at least a first terminal configured as an input terminal and a second terminal configured as an output terminal;

at least one qualification circuit means responsive to a characterized signal received by said first input terminal;

a first memory storing data to define one or more events whereas each of said events has a corresponding starting address located within the addressable range of said first memory;

a second memory of (n+m) bits data format, whereas the m bits data is to define the configuration of a terminal and the n bits data is to define the event starting address of said first memory when said terminal is configured as an input terminal;

an event execution circuit means to produce at least a first event output signal and a second event output signal upon the execution of a first event whereas said first event output signal is coupled to said output terminal for producing an output signal;

a first addressing circuit means responsive to said qualification circuit means, activating said event execution means to execute said first event defined by said event starting address; and a second addressing circuit means responsive to said second event output signal to update the current address of said second memory.

2. The programmable control apparatus of claim 1 wherein said event execution circuit means produces a third event output signal interrupting said first addressing circuit means to activate the address of a second event and execute the second event thereof.

3. The programmable apparatus of claim 1 further comprising a power up circuit means whereby to initiate the defined power up condition of said programmable control apparatus.

4. The programmable control apparatus of claim 1 wherein at least one terminal is an input/output terminal and said m bit data of the second memory define both the input and/or output configuration of said terminal.

5. The programmable control apparatus of claim 4 wherein said second memory comprises a flag to specify said input/output terminal as an output terminal or high impedance terminal and said n bits data is to further define the characteristics of the output signal to be generated through said output terminal.

6. The programmable control apparatus of claim 1 wherein said qualification circuit means is responsive to at least one of the following characterized signals: signal with a rising edge; signal with a falling edge; logic high signal and logic low signal.

7. The programmable control apparatus of claim 1 wherein said output signal comprises of at least one of the following signals: logic high level; logic low level; pulses; and high impedance state.

8. The programmable control apparatus of claim 1 wherein said event execution means comprises of a signal generator.

9. The programmable control apparatus of claim 1 wherein said qualification circuit means is coupled to one or more input terminals.

10. The programmable control apparatus of claim 1 wherein said first memory storing encoded data describing an audio signal.

11. The programmable control apparatus of claim 10 wherein said event execution means produces an audio signal corresponding to said encoded data.

12. The programmable control apparatus of claim 1 further comprising a register to indicate the address of an event to be executed.

13. The programmable control apparatus of claim 12 wherein:
   said first memory storing encoded timing data;
   said control apparatus further comprises a counter to manipulate said encoded timing data; and
   said register indicates the address of an event to be executed according to the counting process of said counter.

14. The programmable control apparatus of claim 12 wherein content of said register is defined by an event stored in said first memory.

15. The programmable control apparatus of claim 1 wherein said first and second memories comprise of at least one of the following memory:
   read only memory;
   erasable programmable read only memory;
   one time programmable read only memory; and
   read and write memory.

16. The programmable control apparatus of claim 1 wherein said first addressing circuit means comprises of a look up table defining the starting addresses of the events in said first memory, said look up table is addressed by the n bit data of the second memory.

17. The programmable control apparatus of claim 1 wherein said n bits data memory and m bits data memory of said second memory are of different addresses and said second addressing circuit means defines the corresponding current addresses of said n bit memory and m bit memory.

18. The programmable control apparatus of claim 1 wherein said apparatus is contained within an integrated circuit.

19. The programmable control apparatus of claim 18 wherein at least two terminals locate on separated locations within said integrated circuit, and said second memory distributes on separated locations proximate to said terminals, or said qualification circuit means.

20. The programmable control apparatus of claim 1 wherein
   k is an integer equal to 16 or smaller;
   m defines up to 16 input/output configurations
   12 n defines up to 128 event starting addresses; and
   said second addressing circuit means defines up to 64 addresses of the second memory.

21. A programming method to program a control apparatus responsive to one or more external qualified electrical signals, to execute one or more events; said control apparatus comprises of at least one terminal configured as an input terminal and at least one terminal configured as an output terminal, said programming method minimally comprises the steps of:
   (1) specify x terminal configuration states, wherein each terminal configuration state defines a status of one or more terminals of said control apparatus and x is an integer equal or greater than one;
   (2) specify y events to be executed by said control apparatus, wherein y is an integer equal or greater than one;
   (3) for every configuration state of step (1), specify the input qualifying condition for each input terminal of said control apparatus;
   (4) for each input terminal of step (3), further specify an event to be executed by said control apparatus when the input signal connected to said input terminal satisfies said input qualifying condition;
   (5) for every configuration state of step (1), specify an output status for each output terminal of said control apparatus;
   (6) specify one of the configuration states to become the active configuration state.

22. The programming method of claim 21 further comprising a step to specify at least one of the events to comprise of p sub-events, wherein p is an integer equal or greater than two.

23. The programming method of claim 22 further comprising a step to specify an event or sub-event to produce at least one of the following effects:
   (a) to generate an audio signal;
   (b) to generate a timing signal;
   (c) to generate a logic high/low signal;
   (d) to generate a pulsing signal;
   (e) to activate another event; and
   (f) to specify another configuration state as the active configuration state.

24. The programming method of claim 23 further comprising a step to specify an event to be executed by the end of said timing signal.

25. The programming method of claim 21 wherein at least one of said events is a variable event, said programming method further comprising a step to equate said variable event with another defined event.

26. The programming method of claim 21 whereas at least one of said terminals is an programmable input/output terminal and said programming method further comprising a step to configure said input/output terminal either as an input terminal, an output terminal, an input/output terminal or a high impedance terminal.

27. The programming method of claim 21 further comprising a step to structure the programming specifications into at least two fields, wherein the first field specifies the characteristics of one or more terminal configures, and the second field specifies one or more events and sub-events.

28. The programming method of claim 21 further comprising a step to organize at least part of the data specified by said steps into a table format.

29. The programming method of claim 21 further comprising a step to translate the specifications of the configuration states and the events into digital data to be stored into said control apparatus for the execution of the events thereof.

30. The programming method of claim 29 further comprising a step to transfer said digital data onto a photo mask to fabricate said control apparatus.

31. The programming method of claim 21 further comprising a step to translate the specifications of the configuration states and the events into a secondary programming language of different format.

32. The programming method of claim 21 further comprising the following steps to interactively simulate the operation of the control apparatus on a display device:

(7) display the specification of at least one configuration state;

(8) display the specification of at least one event;

(9) indicate the active configuration state;

(10) specify a terminal to receive a qualified stimulation signal; and

(11) indicate and/or simulate the event or sub-event under execution.

33. The programming method of claim 32 further comprising a step to edit the data displayed.

34. The programming method of claim 32 further comprising the step to correlate the two fields with a flow chart comprising of blocks and paths interconnecting said blocks, wherein each block corresponds to one or more terminal configuration states of said first field and each path corresponds to the an event of said second field.

35. The programming method of claim 32 further comprising the step to arrange an input/output circuit means responsive to said specification of the configuration states and events; and connect said input/output circuit means with an external application circuit whereby to emulate the operation of said control apparatus.

36. The programming method of claim 21 wherein the specification of said x terminal configuration states and said y events are not necessary to be listed in sequential relationship to each other.

37. The programming method of claim 21 wherein said programming steps does not comprise of any one at a line instruction set, said instruction set comprises of instructions defined by an operation and at least one operand.

38. The programming method of claim 21 further comprising a step to specify the power up condition of said control apparatus.

39. The programming method of claim 21 further including a step to encode said configuration states and events into codes executable by said control apparatus.

40. The programming method of claim 21 wherein said control apparatus is a microprocessor.

41. A programmable control apparatus contained within an integrated circuit comprising:

input/output circuit means comprising two or more terminals, each of said terminals is configured as an input and/or output terminal, and qualification circuit means responsive to one or more characterized signals received by an input terminal, whereas said terminals locate on separated locations within said integrated circuit;

event execution circuit means responsive to the response of said qualification means for executing an event and activating said output circuit means to produce an output signal; and different blocks of memory means, each defining the programmable characteristics of a corresponding terminal distributes on different separated locations of said integrated circuit proximate to said corresponding terminals.

42. The programmable control apparatus of claim 41 wherein said memory further storing data indicating the addressing of the event to be executed in response to said qualification circuit means.

* * * * *